(12) United States Patent
De Leon et al.

(10) Patent No.: US 7,872,213 B2
(45) Date of Patent: Jan. 18, 2011

(54) COOKING APPLIANCE WITH REMOVABLE COOKING SURFACE

(75) Inventors: Edwin De Leon, Southbridge, MA (US); Richard I Skoglund, Farmington, CT (US); Lao Shun Man, Hong Kong (HK); Hoi Sun Tony Tam, Hong Kong (HK); Tsang Chi Sheung, Hong Kong (HK); Kwun Wai Waiman Yeung, Hong Kong (HK)

(73) Assignee: Sunbeam Products, Inc., Boca Raton, FL (US)

( * ) Notice: Subject to any disclaimer, the term of this patent is extended or adjusted under 35 U.S.C. 154(b) by 477 days.

(21) Appl. No.: 11/603,403

(22) Filed: Nov. 22, 2006

(65) Prior Publication Data

US 2007/0137499 A1 Jun. 21, 2007

Related U.S. Application Data

(60) Provisional application No. 60/739,127, filed on Nov. 23, 2005.

(51) Int. Cl.
*F27D 11/00* (2006.01)

(52) U.S. Cl. .......................... 219/385; 99/376; 99/422; 99/372; 99/339

(58) Field of Classification Search ................... 99/385, 99/376, 422, 371, 391, 402, 372, 339; 219/385, 219/432
See application file for complete search history.

(56) References Cited

U.S. PATENT DOCUMENTS

| 213,763 | A |  | 4/1879 | Lee |
| 875,972 | A |  | 1/1908 | Wessel |
| 1,120,884 | A |  | 12/1914 | Ayer |
| 2,597,695 | A |  | 5/1952 | Braski et al. |
| 2,765,727 | A |  | 10/1956 | Lipsich et al. |
| 2,785,277 | A |  | 3/1957 | Jepson |
| 2,899,888 | A | * | 8/1959 | Koci ........................... 99/331 |
| 3,172,999 | A |  | 3/1965 | Sutton et al. |
| 3,215,063 | A |  | 11/1965 | Olson |
| 3,262,382 | A |  | 7/1966 | Williams |
| 3,395,266 | A | * | 7/1968 | Price .......................... 219/433 |
| 3,635,371 | A |  | 1/1972 | Oxel |
| D231,069 | S |  | 4/1974 | Boldt |
| 3,831,002 | A |  | 8/1974 | Mysicka et al. |
| 3,938,431 | A |  | 2/1976 | Potvin |
| 4,002,112 | A |  | 1/1977 | Snyder ........................ 99/376 |
| D247,946 | S |  | 5/1978 | Painter et al. |
| 4,102,256 | A |  | 7/1978 | John et al. |
| 4,150,609 | A |  | 4/1979 | McClean |

(Continued)

FOREIGN PATENT DOCUMENTS

DE 8618892 10/1986

(Continued)

*Primary Examiner*—Tu B Hoang
*Assistant Examiner*—John Wasaff
(74) *Attorney, Agent, or Firm*—Lawrence J. Shurupoff

(57) ABSTRACT

An electric cooking appliance having a removable food support member and a base that supports a heating element and the food support member is provided. The appliance includes a plurality of handles that selectively engage the food support member to secure it to the base. The cooking appliance allows for cooking of foods on a cooking surface of the food support member and removing the food support member.

24 Claims, 19 Drawing Sheets

U.S. PATENT DOCUMENTS

| | | |
|---|---|---|
| D263,363 S | 3/1982 | Williams et al. |
| D265,538 S | 7/1982 | Nauheimer et al. |
| 4,364,308 A | 12/1982 | John et al. |
| 4,438,324 A | 3/1984 | Narita et al. |
| 4,463,249 A | 7/1984 | Narita et al. |
| 4,677,964 A | 7/1987 | Lohmeyer et al. |
| 4,913,047 A | 4/1990 | Burley |
| 5,167,183 A | 12/1992 | Schlosser et al. |
| 5,222,475 A | 6/1993 | Greener |
| D338,132 S | 8/1993 | Chang |
| 5,251,608 A | 10/1993 | Cote |
| 5,269,286 A | 12/1993 | Cowan |
| 5,352,866 A | 10/1994 | Cartwright et al. |
| 5,400,700 A * | 3/1995 | Bois .......................... 99/403 |
| 5,410,948 A | 5/1995 | Eickmeyer |
| D359,652 S | 6/1995 | Mendelson et al. |
| D366,592 S | 1/1996 | Cesaroni et al. |
| D369,059 S | 4/1996 | Carnovali |
| D369,272 S | 4/1996 | Mendelson et al. |
| 5,504,295 A | 4/1996 | Collas et al. |
| 5,524,528 A | 6/1996 | Yeh |
| 5,546,851 A | 8/1996 | Goto |
| 5,606,905 A | 3/1997 | Boehm et al. |
| D378,648 S | 4/1997 | Perry |
| D380,645 S | 7/1997 | Perlini |
| D381,242 S | 7/1997 | Rossiaud |
| D381,553 S | 7/1997 | Candianides |
| 5,676,043 A | 10/1997 | Best .......................... 99/331 |
| 5,839,357 A | 11/1998 | Ha et al. |
| 5,839,361 A | 11/1998 | Richter |
| RE35,998 E | 12/1998 | Goto |
| 5,884,555 A | 3/1999 | Chang |
| 5,911,812 A | 6/1999 | Stanek et al. |
| D412,263 S | 7/1999 | Jozancy |
| 5,967,024 A | 10/1999 | DeMars |
| D416,167 S | 11/1999 | Barker |
| 6,003,436 A | 12/1999 | Masel et al. |
| 6,024,014 A | 2/2000 | Kasai |
| 6,038,965 A | 3/2000 | Thorndyke |
| 6,062,130 A * | 5/2000 | Brady ....................... 99/332 |
| 6,064,042 A * | 5/2000 | Glucksman et al. .... 219/452.13 |
| 6,073,542 A | 6/2000 | Perez |
| D429,946 S | 8/2000 | Lee |
| 6,097,004 A | 8/2000 | Seul |
| 6,100,504 A | 8/2000 | Wagner |
| 6,105,487 A | 8/2000 | Nash et al. |
| D430,454 S | 9/2000 | Garber et al. |
| D431,152 S | 9/2000 | Lee |
| D431,411 S | 10/2000 | Chang |
| 6,155,159 A | 12/2000 | Bizard |
| D435,755 S | 1/2001 | Deni |
| 6,170,389 B1 | 1/2001 | Brady |
| D437,182 S | 2/2001 | Choi |
| D442,426 S | 5/2001 | Garber et al. |
| 6,252,204 B1 | 6/2001 | Po-Hei |
| D444,342 S | 7/2001 | Kruepke et al. |
| 6,262,399 B1 | 7/2001 | Lau et al. |
| 6,263,787 B1 | 7/2001 | Tseng et al. |
| 6,283,014 B1 | 9/2001 | Ng et al. |
| 6,283,015 B1 | 9/2001 | Kwon et al. |
| 6,314,871 B1 | 11/2001 | Holbrook et al. |
| D452,630 S | 1/2002 | Choi |
| 6,443,052 B1 | 9/2002 | Garber et al. |
| 6,472,644 B1 * | 10/2002 | Wu ......................... 219/450.1 |
| D473,419 S | 4/2003 | Garman |
| 6,545,252 B2 | 4/2003 | Wang |
| 6,565,903 B2 | 5/2003 | Ng et al. |
| 6,573,483 B1 | 6/2003 | DeCobert et al. |
| 6,580,056 B1 | 6/2003 | Tacha |
| 6,593,552 B1 | 7/2003 | Li |
| 6,595,114 B1 | 7/2003 | Endres et al. |
| 6,603,099 B2 | 8/2003 | Gouthiere |
| 6,630,650 B2 | 10/2003 | Bassill et al. |
| 6,653,602 B2 | 11/2003 | Li |
| 6,686,569 B2 | 2/2004 | Li |
| 6,711,990 B1 | 3/2004 | Harrison |
| D500,629 S | 1/2005 | Huggler et al. |
| 6,840,159 B1 | 1/2005 | Li |
| 6,844,529 B2 | 1/2005 | Grohs |
| 6,852,953 B1 | 2/2005 | Lee |
| D503,066 S | 3/2005 | Militi |
| 2003/0173352 A1 | 9/2003 | Patterson et al. |
| 2004/0079747 A1 | 4/2004 | Wang |
| 2004/0261623 A1 | 12/2004 | Huggler et al. |
| 2005/0005776 A1 | 1/2005 | Steinberg et al. |
| 2005/0247211 A1 | 11/2005 | Crawford et al. |

FOREIGN PATENT DOCUMENTS

| | | |
|---|---|---|
| DE | 8701614 | 6/1987 |
| DE | 20015655 | 1/2001 |
| DE | 19935983 | 2/2001 |
| EP | 0578360 B1 | 1/1994 |
| EP | 1433405 | 12/2002 |
| EP | 1317201 | 6/2003 |
| JP | 54-142165 | 3/1953 |
| JP | 59-181618 | 12/1984 |
| JP | 62-41626 | 2/1987 |
| JP | 64-43840 | 3/1989 |
| JP | 04-129512 | 4/1992 |
| JP | 05-1430 | 1/1993 |
| JP | 07-275130 | 10/1995 |
| JP | 08-191763 | 7/1996 |
| JP | 08-224175 | 9/1996 |
| JP | 08-308743 | 11/1996 |
| JP | 10-216021 | 8/1998 |
| JP | 10-328037 | 12/1998 |
| JP | 11-046987 | 2/1999 |
| JP | A-200-083831 | 3/2000 |
| JP | 229030 | 8/2000 |
| JP | 169925 | 6/2001 |
| JP | 209755 | 7/2002 |
| WO | WO 2004107942 | 6/2004 |

* cited by examiner

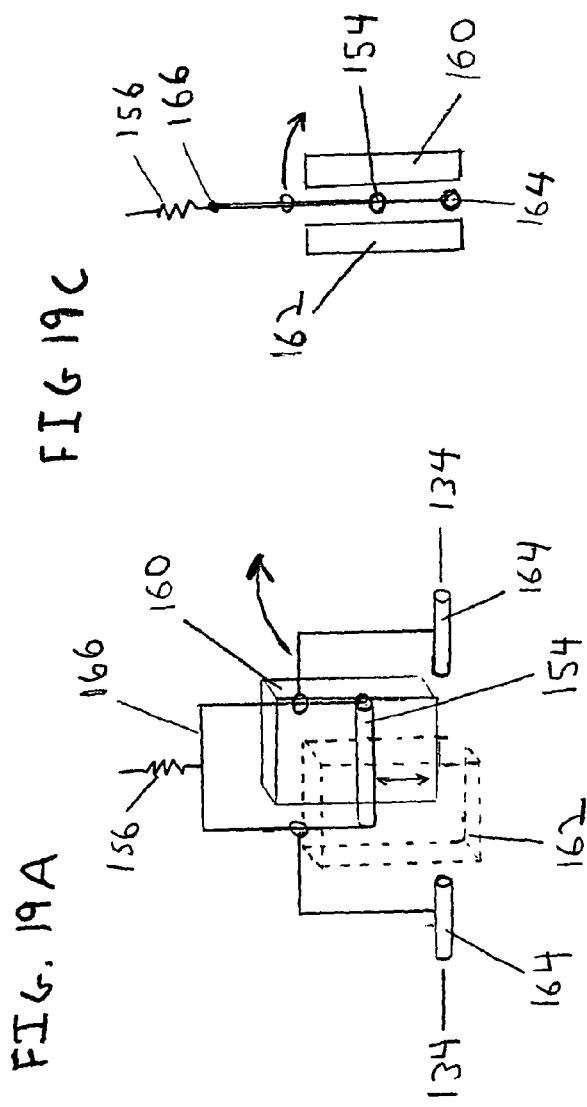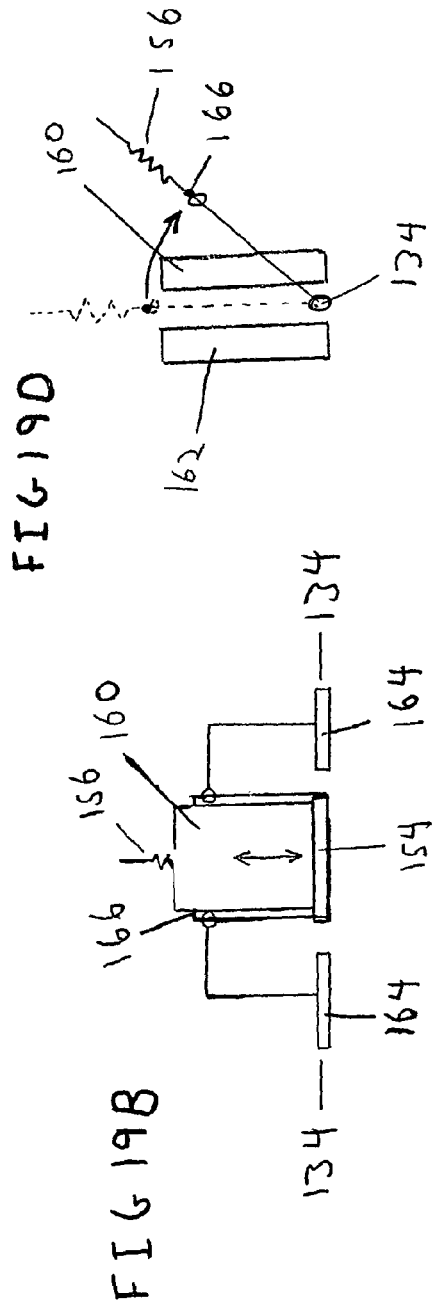

COOKING APPLIANCE WITH REMOVABLE COOKING SURFACE

CROSS REFERENCE TO RELATED APPLICATION

This application claims the benefit of U.S. Provisional Application No. 60/739,127 filed on Nov. 23, 2005, and which is incorporated by reference herein in its entirety.

FIELD OF THE INVENTION

The invention relates to an electric cooking appliance having a removable cooking surface.

BACKGROUND OF THE INVENTION

The present invention relates to electric cooking appliances that typically stand on a table top such as a work surface in a kitchen. Such appliances are well known in the art and include a housing having an electric heating element. Typically, the heating element is connected to and permanently attached to a platen making up the heating surface. In cooking appliances of the prior art, if the heated platen or cooking surface is not removable, it is difficult to clean the cooking surface. This is because the heating element and wiring typically cannot be wetted and certainly not immersed in water to wash the cooking surface, unless properly sealed.

One attempt to overcome or reduce this problem has been to provide removable and disposable liners for the platens that can be removed and washed, or disposed of, respectively. However, there is difficulty and expense associated with preparing suitably configured liners for ensuring good heat transfer between the heated platens and the liner. With disposable liners, the procedure to wholly remove and replace the liner is not always efficient, in that parts of the liner may stick to the heated platen, and suitable liner material can be difficult to find or can be expensive in many instances. This is especially true with relatively high temperature cooking surfaces, such as needed for a griddle or a skillet.

Electric cooking appliances have also been suggested that include removable cooking surfaces for purposes of cleaning the cooking surface. However, such prior art cooking appliances have drawbacks. In many instances the platen making up the cooking surface is not sufficiently secured to the base of the appliance or is difficult to remove from the base.

Accordingly, it would be desirable to provide a cooking appliance that includes a cooking surface that is adequately secured to the base of the appliance and is also easily removed from the base. It would also be desirable to allow the cooking surface to be easily removed for cleaning and/or directly function as a serving dish for the prepared food.

SUMMARY OF THE INVENTION

It is an advantage of the present invention to provide an electric cooking appliance having a removable food support member.

It is another advantage of the present invention to provide an electric cooking appliance having heating elements in the base of the appliance positioned to provide the required heat for the cooking surface of the removable food support member.

It is a further advantage of the present invention to provide an electric cooking appliance in which the removable food support member and the base are configured to prevent or reduce the ability of the food support member from sliding relative to the base.

It is still a further advantage of the present invention to provide an electric cooking appliance having a plurality of handles that can be used to transport the appliance and also selectively secure the food support member to the base.

It is yet a further advantage of the present invention to provide handles that can selectively secure the food support member to the base, as well as selectively provide sufficient clearance to easily remove the food support member from the base. In one embodiment, the handles can be selectively positioned to provide clearance to allow the food support member to be lifted vertically off the base.

In the efficient attainment of these and other advantages, the present invention includes a cooking appliance including a base having an upper surface, a lower surface and a perimeter wall. An electrical heating element is supported on the base. A removable food support member having a cooking surface and an opposed bottom surface is supported by the upper surface of the base. The appliance also includes a plurality of handles extending from the base and positioned to extend above the upper surface and selectively engage the removable food support member to secure the food support member to the base. In one embodiment, the removable food support member is selected from the group consisting of a griddle and a skillet.

In a preferred embodiment, the upper surface of the base and the bottom surface of the food support member are configured to cooperate to substantially prevent the food member from shifting position relative to the base. In such an embodiment, the food support member can include a wall projecting away from the bottom surface forming a skirt that fits closely around the perimeter wall of the base when the bottom surface is supported by the upper surface of the base.

In one aspect, the removable food support member includes a cooking surface, an opposed bottom surface supported by the upper surface of the base, a side wall forming a perimeter around the cooking and bottom surfaces and a plurality of tabs projecting from the side wall. In this aspect, the appliance can include a plurality of handles extending from the base and positioned to extend above the upper surface and selectively engage the tabs to secure the food support member to the base.

In another aspect, the plurality of handles extending from the base and positioned to extend above said upper surface, can selectively pivotally engage the tabs to secure the food support member to the base. These handles can also be selectively pivoted to disengage the food support member to allow it to be removed from the base. The handles can also include a locking mechanism to prevent the handles from pivotally disengaging from the food support member. The locking mechanism can be selectively disengaged to allow the handles to pivot away from the food support member.

The present invention further provides an electric cooking appliance including a base having an upper surface, a lower surface and a perimeter wall. An electrical heating element is supported above the upper surface. A removable food support member having a cooking surface and an opposed bottom surface is supported by the upper surface of the base. A first and second handle extend from opposing sides of the base and are positioned to extend above the base upper surface. The first and second handles have a securement device selectively engagable with the removable food support member to removably secure the food support member to the base.

The present invention still further provides an electric cooking appliance including a base having an upper surface, a lower surface and a perimeter wall. An electrical heating element supported on the base. A removable food support member having a cooking surface and an opposed bottom surface is supported by the upper surface of the base. The food support member includes a side wall forming a perimeter around the cooking and bottom surfaces A plurality of tabs project from the side wall. A plurality of handles extend from the base, and at least one of the handles pivotally engages a one of the tabs projecting from the side wall to secure the food support member to the base.

A preferred form of the electric cooking appliance, as well as other embodiments, objects, features and advantages of the present invention will be apparent from the following detailed description of illustrative embodiments thereof, which will be read in conjunction with the accompanying drawings.

BRIEF DESCRIPTION OF THE DRAWINGS

FIGS. 19A-19D are schematic representations showing the mechanical action of a preferred locking mechanism for a rotatable handle.

DETAILED DESCRIPTION OF THE PREFERRED EMBODIMENTS

The present invention provides an electric cooking appliance having a removable food support member and a base that supports a heating element and the food support member. The cooking appliance allows for cooking of foods on the cooking surface of the food support member and thereafter easily removing the food support member for cleaning or, in some embodiments, for serving the food or for further cooking such as by placing the food support member in an oven. Preferably, the invention is directed to an electric cooking appliance that includes a removable griddle or skillet.

Figure 1:
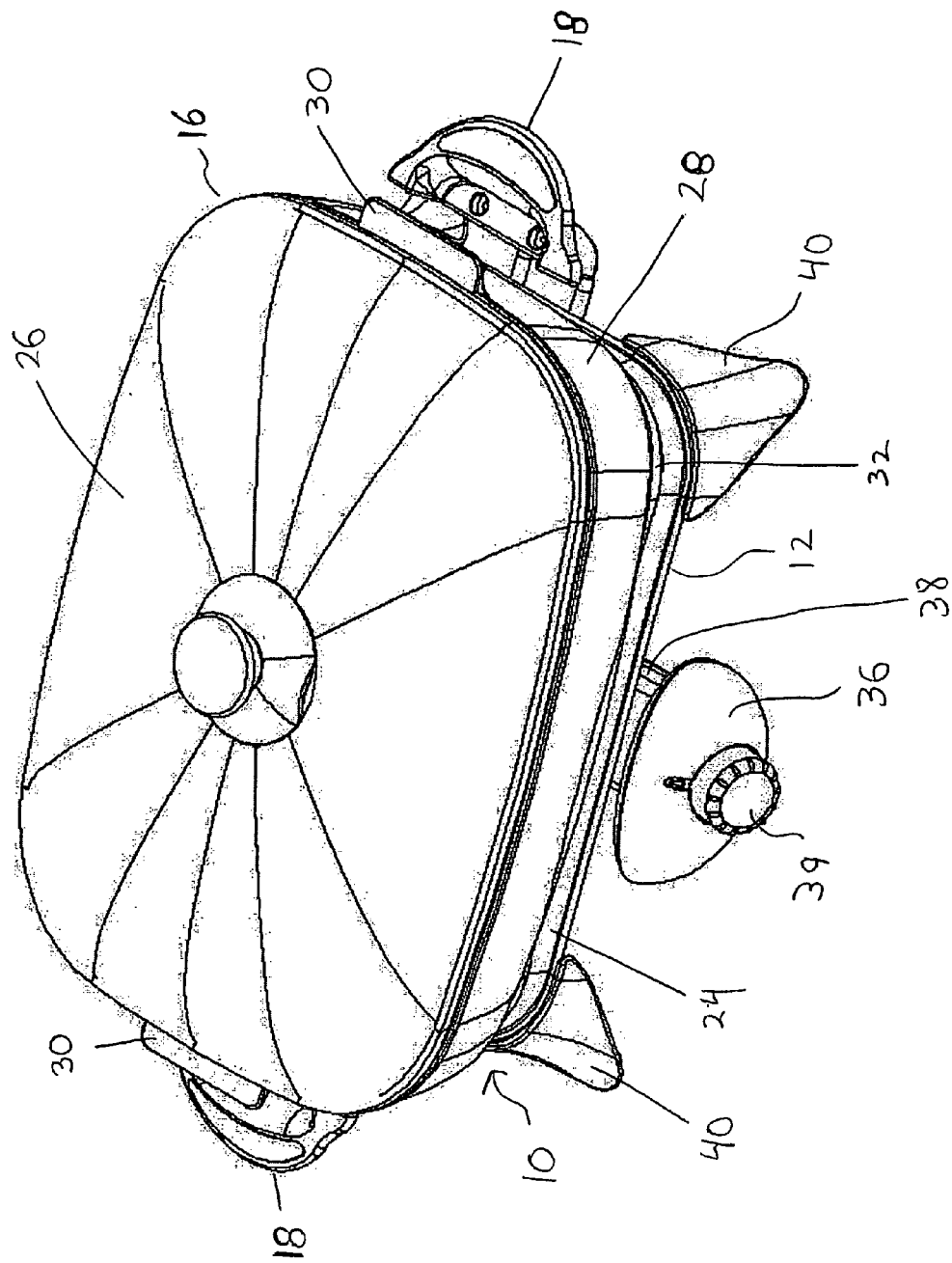
FIG. 1 is a top perspective view of a cooking appliance of the present invention with a removable food support member.
Figure 2:
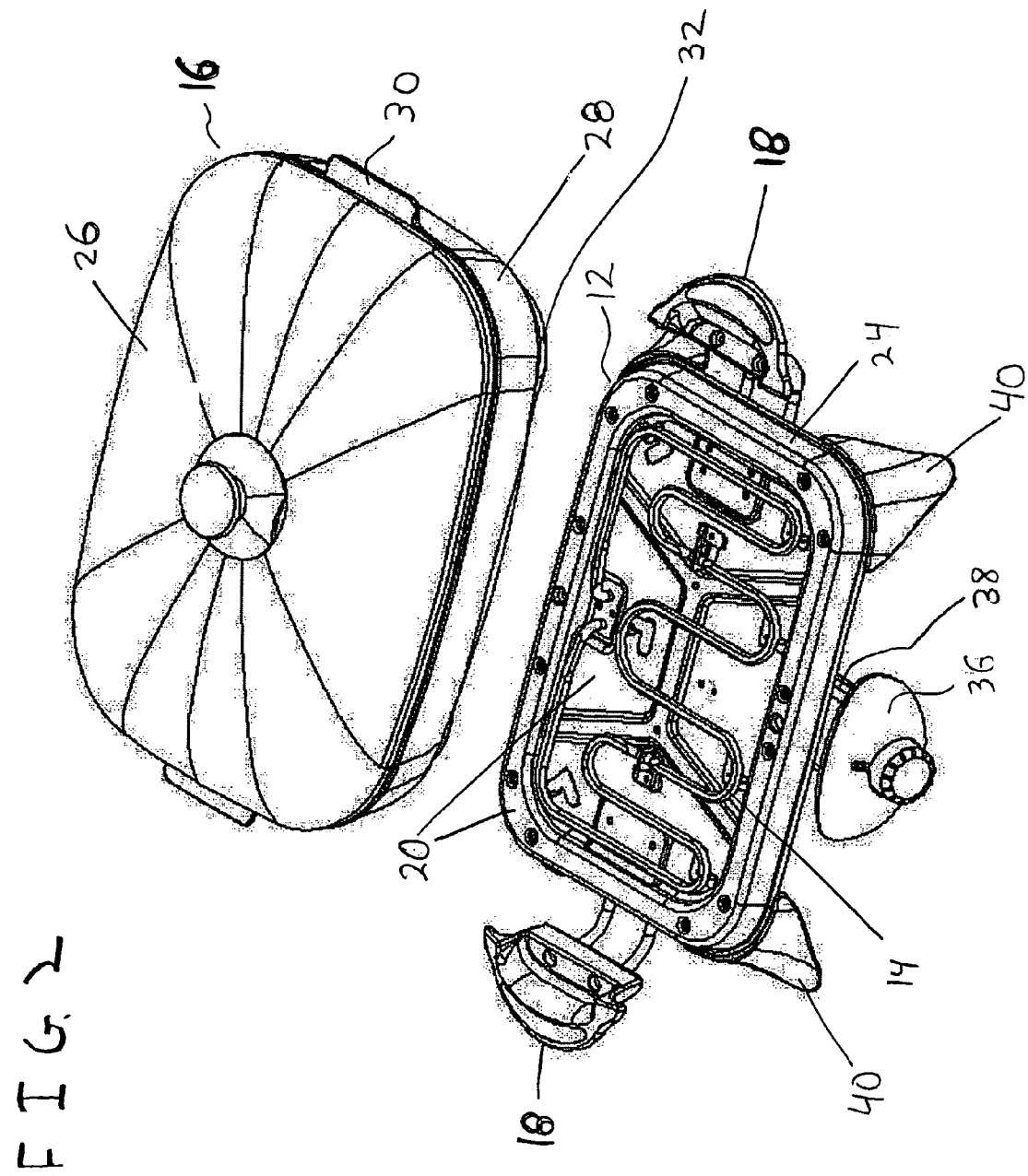
FIG. 2 is an exploded perspective view of the cooking appliance of FIG. 1, with the food support member removed from its base assembly.
Figure 3:
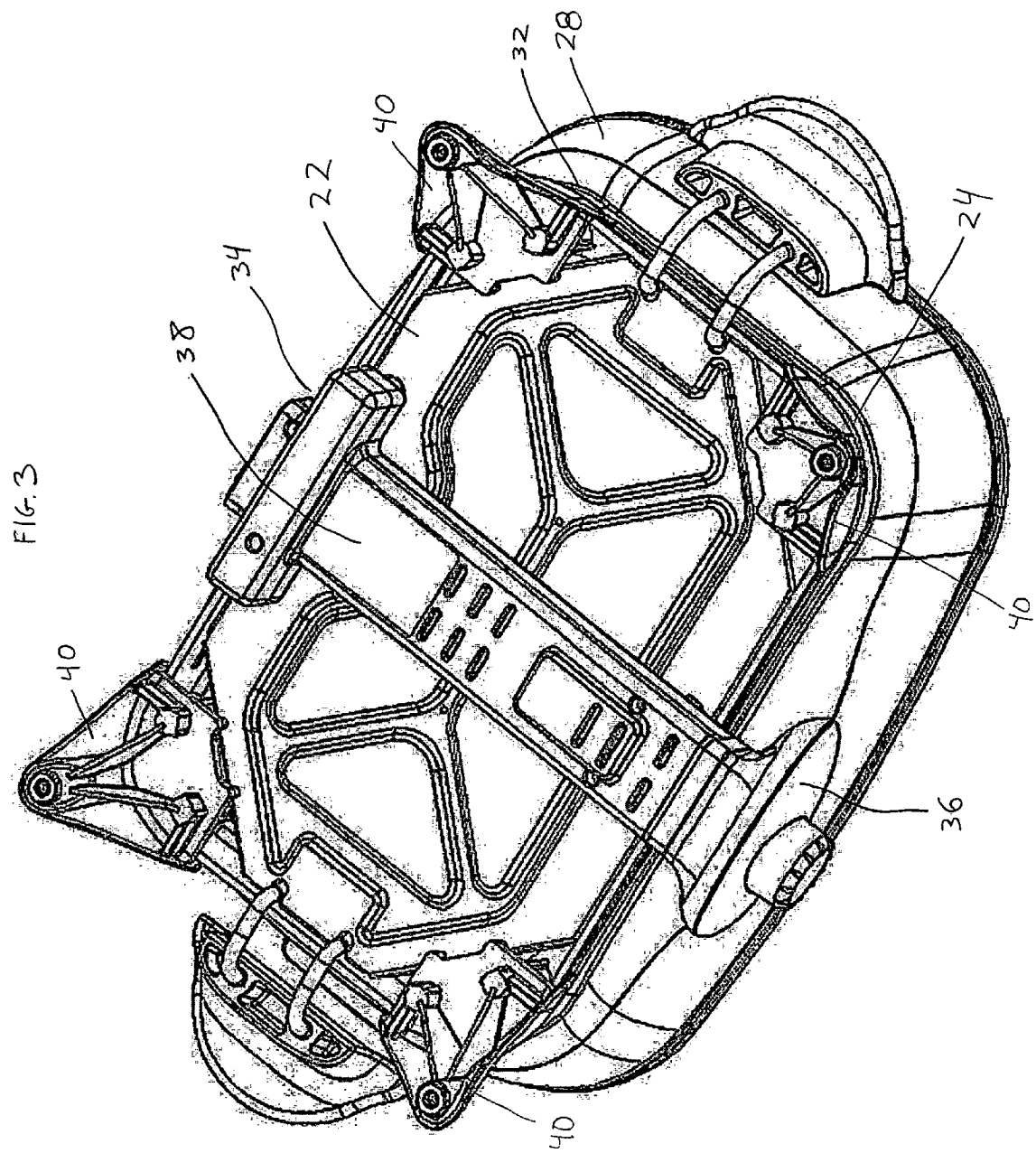
FIG. 3 is a bottom perspective view of the cooking appliance of FIG. 1.
Figure 4:
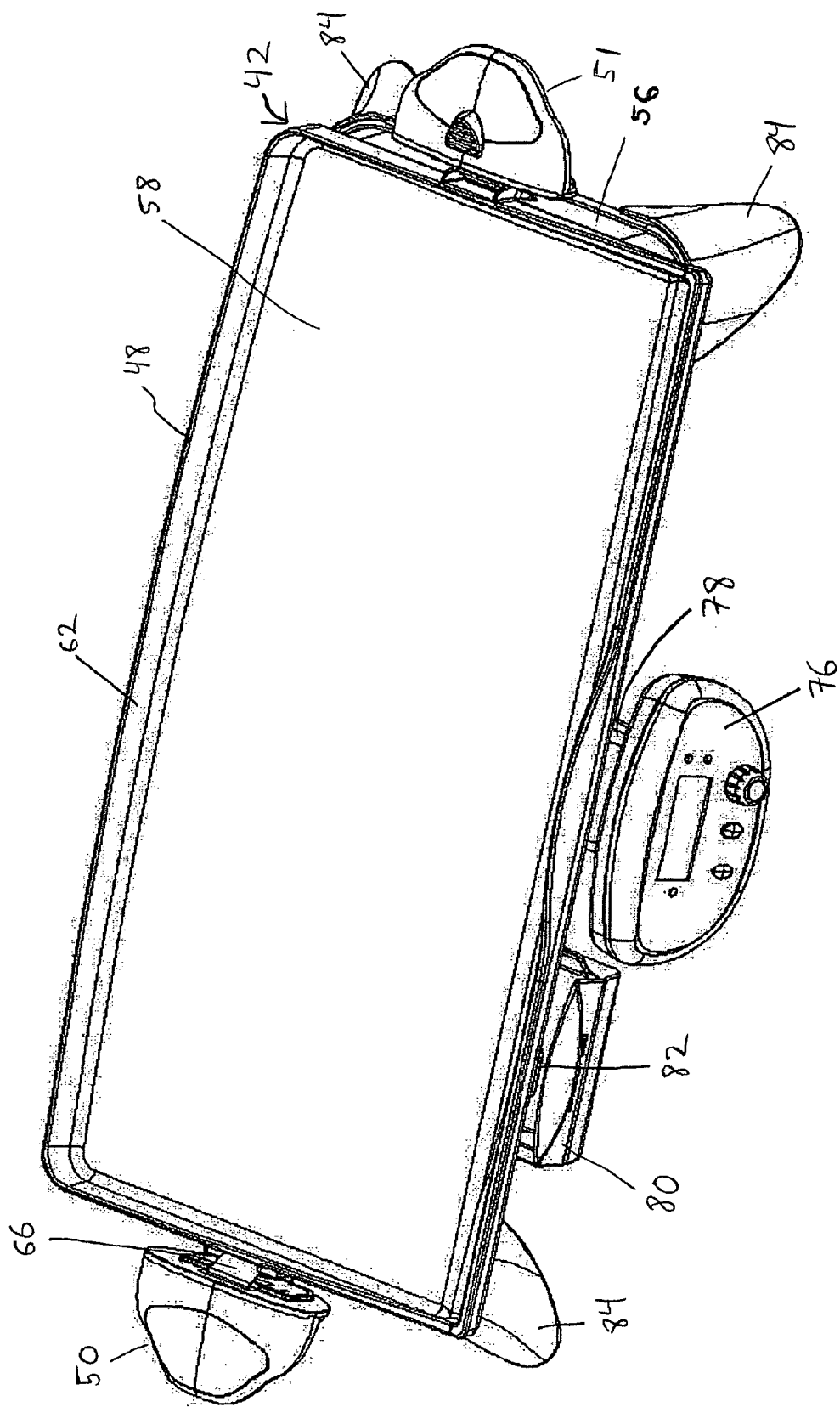
FIG. 4 is a top perspective view of a cooking appliance of the present invention with a removable food support member having tabs and with handles securing the food member by engaging the tabs.
Figure 5:
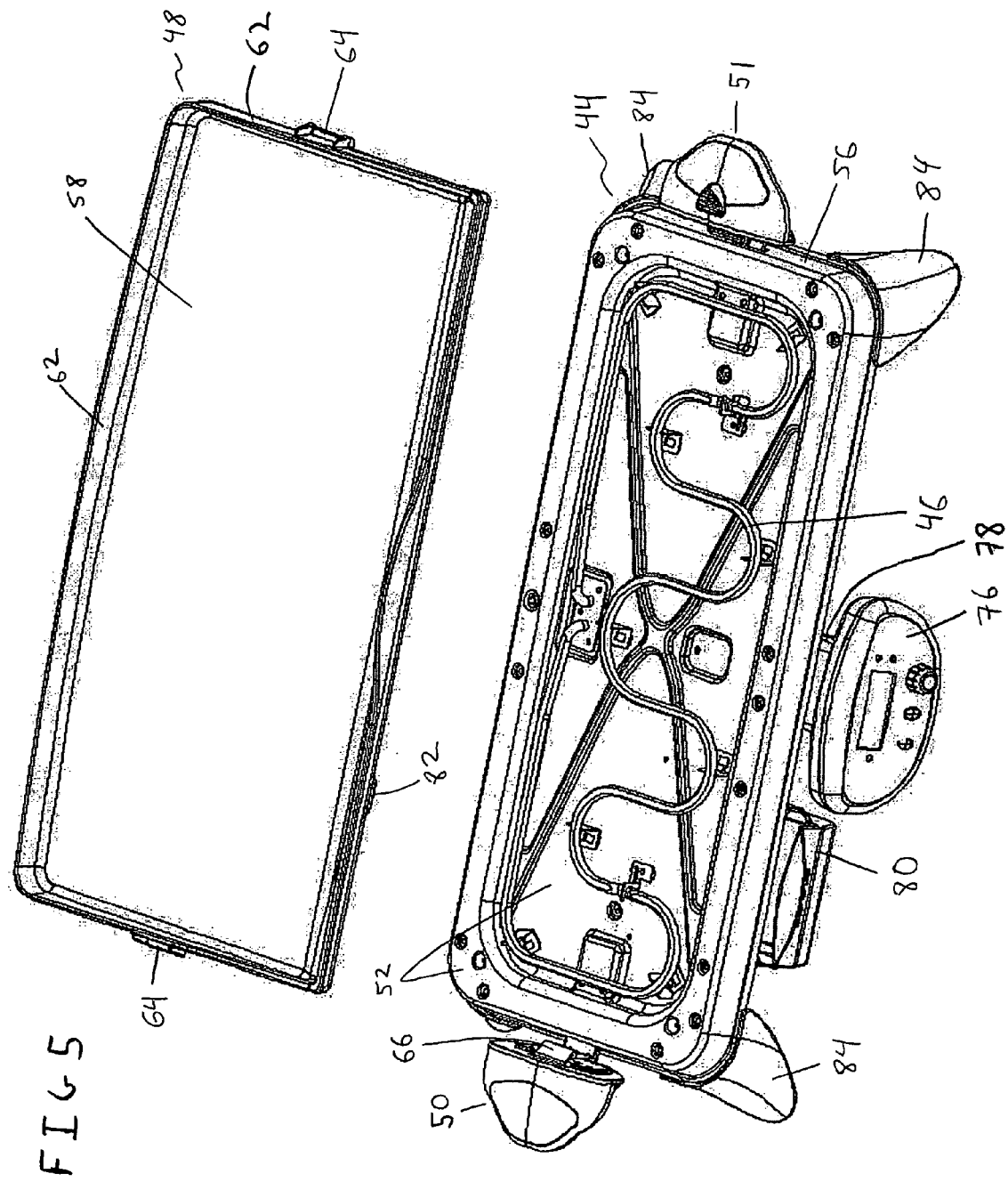
FIG. 5 is an exploded perspective view of the cooking appliance of FIG. 4, with the food support member removed from its base assembly.
Figure 6:
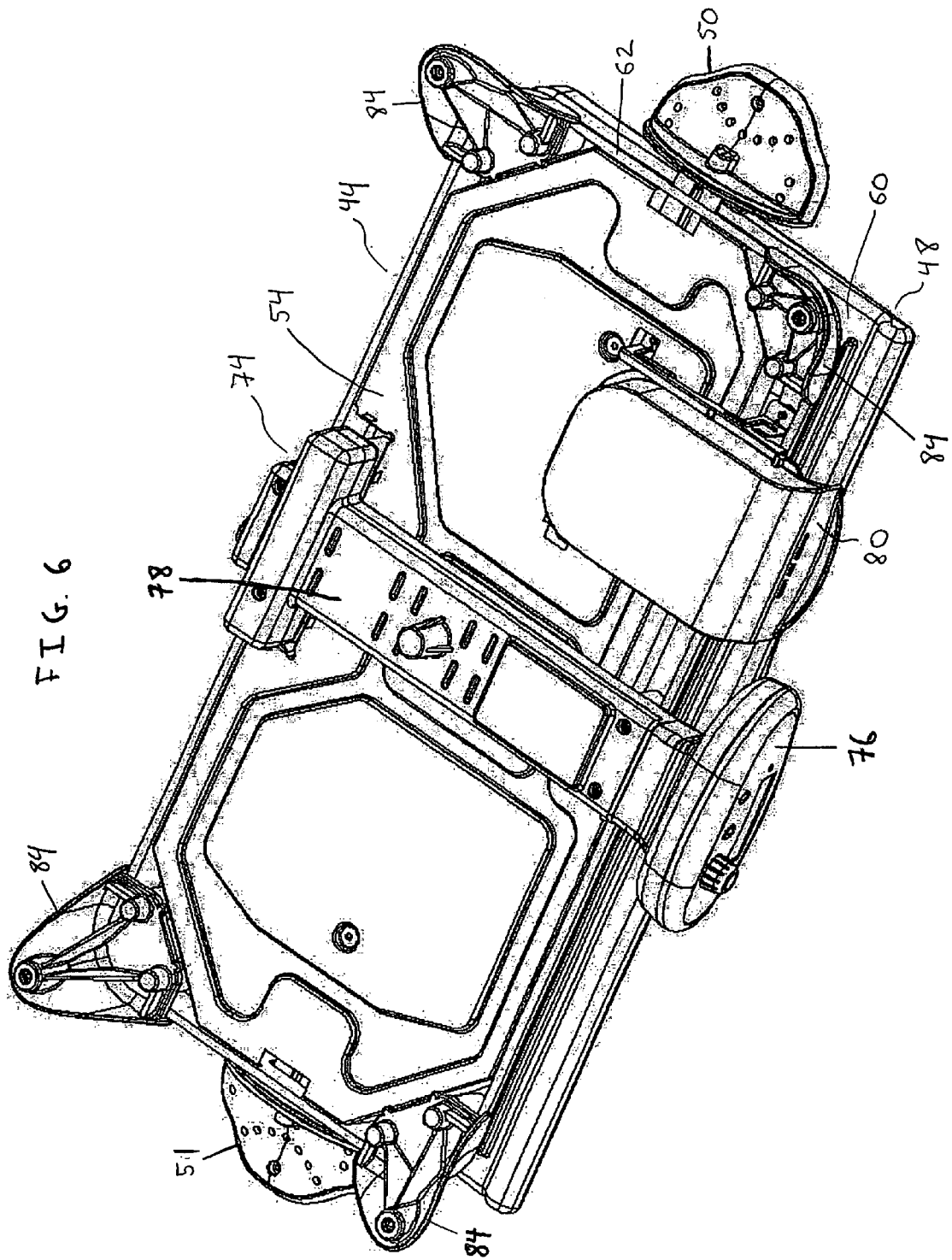
FIG. 6 is a bottom perspective view of the cooking appliance of FIG. 4.

Referring initially to FIGS. 1 through 3, a cooking appliance 10 of the present invention is shown that generally includes a base 12, a heating element 14, a removable food support member 16 and handles 18. The base 12 includes an upper surface 20, a lower surface 22 and a perimeter wall 24. The heating element 14 is supported above the upper surface 20 of the base. The removable food support member 16 is shown as a skillet with a cover 26. The food support member 16 includes a cooking surface (not shown), an opposed bottom surface (not shown) supported by the upper surface 20 of the base 12, a side wall 28 forming a perimeter around the cooking and bottom surfaces and tabs 30 projecting from the side wall 28. The tabs 30 can function as handles for the food support member 16, for removal of the food support member 16 from the base 12 and for transporting the food support member 16. The food support member 16 also includes a bottom wall 32 that forms a skirt around the perimeter of the bottom surface of the food support member 16. This skirt fits relatively closely around the upper edge of the perimeter wall 24 of the base 12 and prevents the food support member 16 from shifting relative to the base 12, when supported by the upper surface 20 of the base 12.

The handles 18 are supported by the base 12 and are positioned to extend above the upper surface 20 of the base 12. The handles 18 are also positioned to allow clearance for easily grabbing the tabs 30 for use as handles for the food support member 16, i.e., the skillet.

The appliance also includes a control panel assembly 34 that includes a temperature control panel 36 and a wire housing 38. The control panel 36 may include a temperature selection knob 39. The control panel assembly 34 is attached to the lower surface 22 of the base 12. The temperature control panel 36 extends forward beyond the perimeter wall 24 of the base 12, for easy access by a user of the appliance. The wire housing 38 is a narrow channel that houses the wires connecting the temperature control panel 36 to the heating element 14. The wire housing 38 is preferably substantially smaller in width compared to the base 12 of the appliance.

The appliance also includes support members 40 that support the base and provide clearance beneath the lower surface 22 of the base 12 for the control panel assembly 34.

Referring to FIGS. 4 through 9, a cooking appliance 42 of the present invention is shown that generally includes a base 44, a heating element 46, a removable food support member 48 and a first handle 50 and a second handle 51. The base 44 includes an upper surface 52, a lower surface 54 and a perimeter wall 56. The heating element 46 is supported above the upper surface 52 of the base 44. In this embodiment, the removable food support member 48 is shown as a griddle. The food support member 48 includes a cooking surface 58, an opposed bottom surface 60 supported by the upper surface 52 of the base 44, a side wall 62 forming a perimeter around the cooking surface 58, a bottom 60 surfaces, and tabs 64 projecting from the side wall 62.

Figure 7:
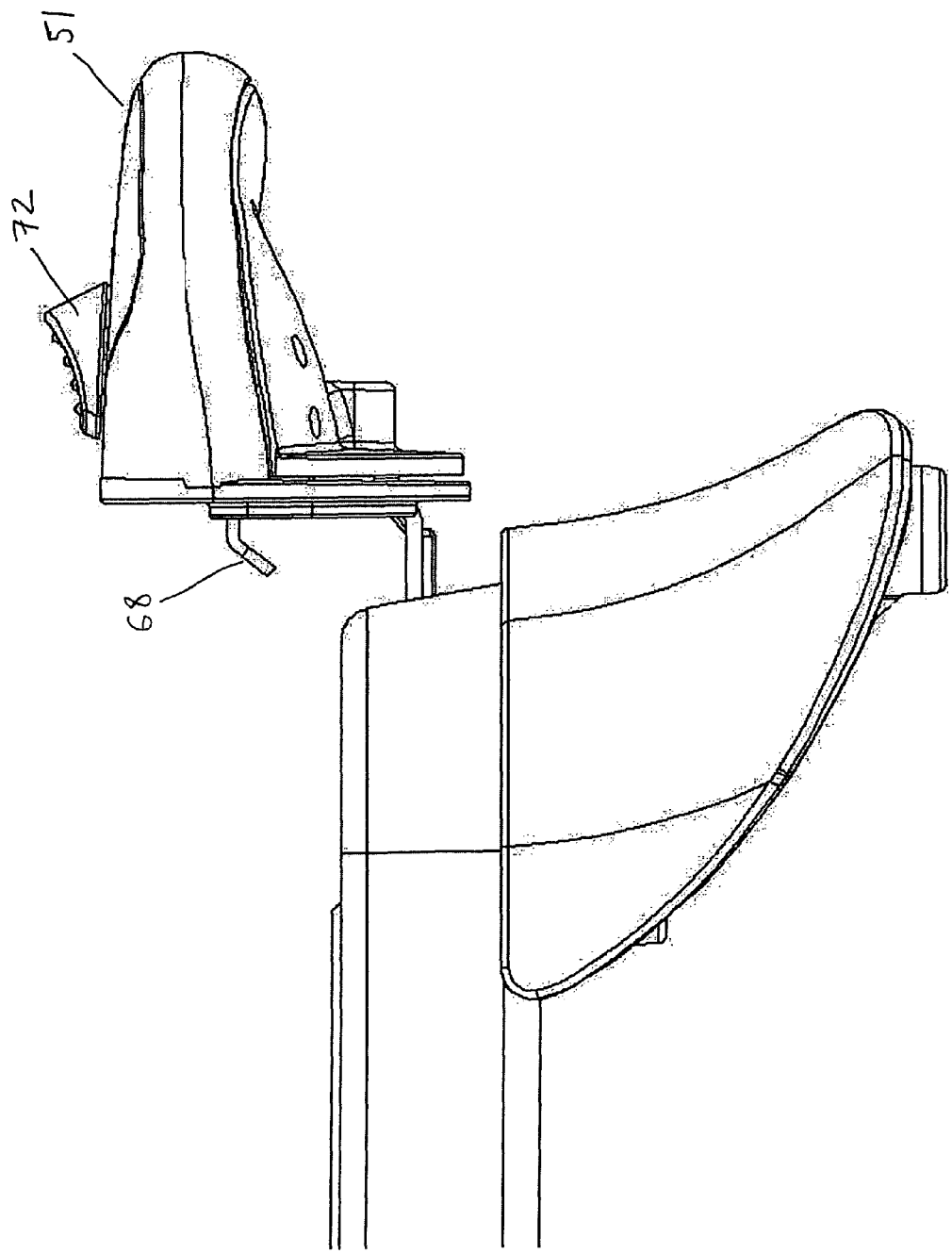
FIG. 7 is a side view of a handle of FIGS. 4-6 showing a catch member for engaging a tab of the food support member.
Figure 8:
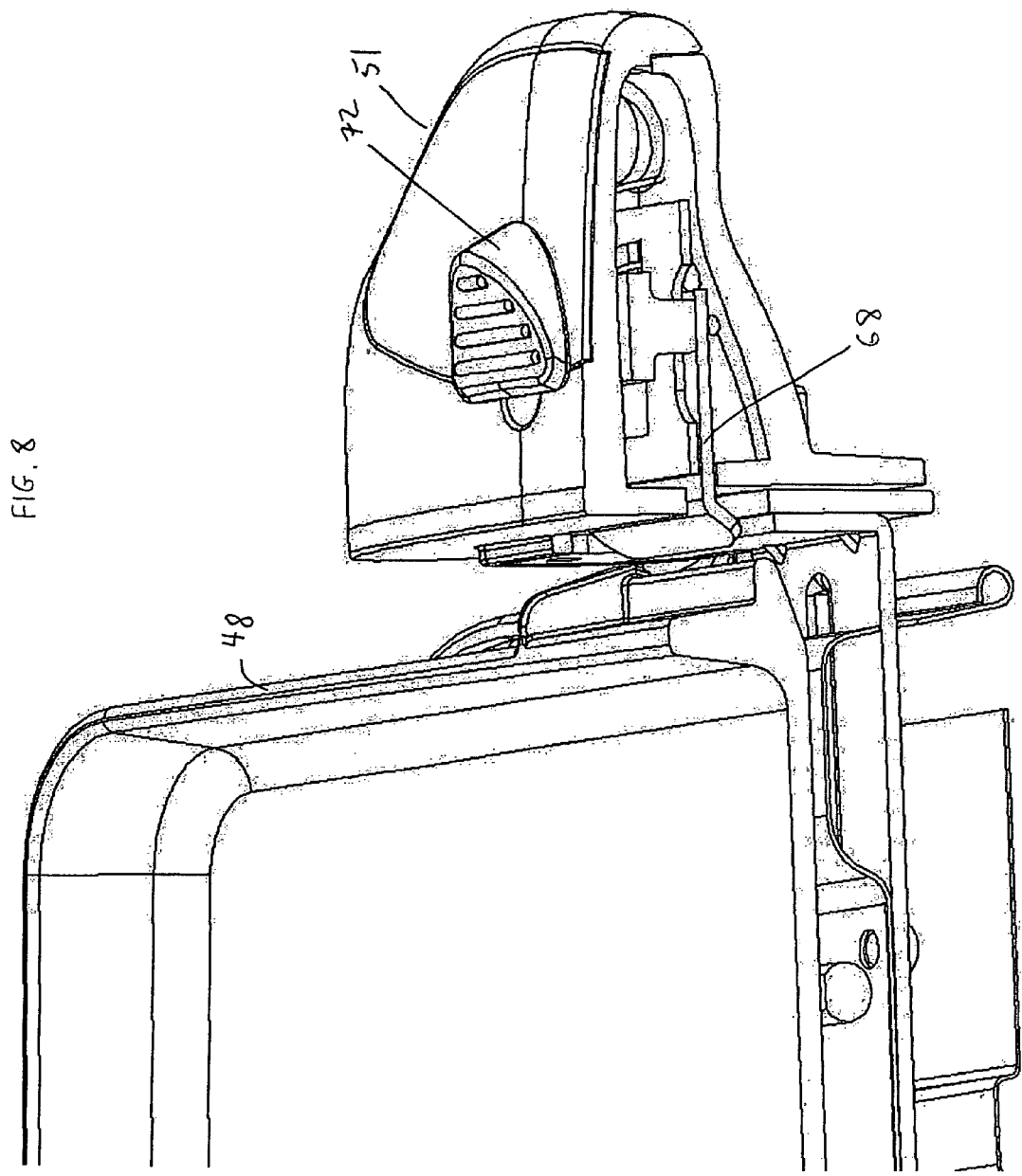
FIG. 8 is a partial top perspective cross section view of a cooking appliance of the present invention showing a removable food support member having a tab and a handle for securing the food member with a retracted catch member.
Figure 9:
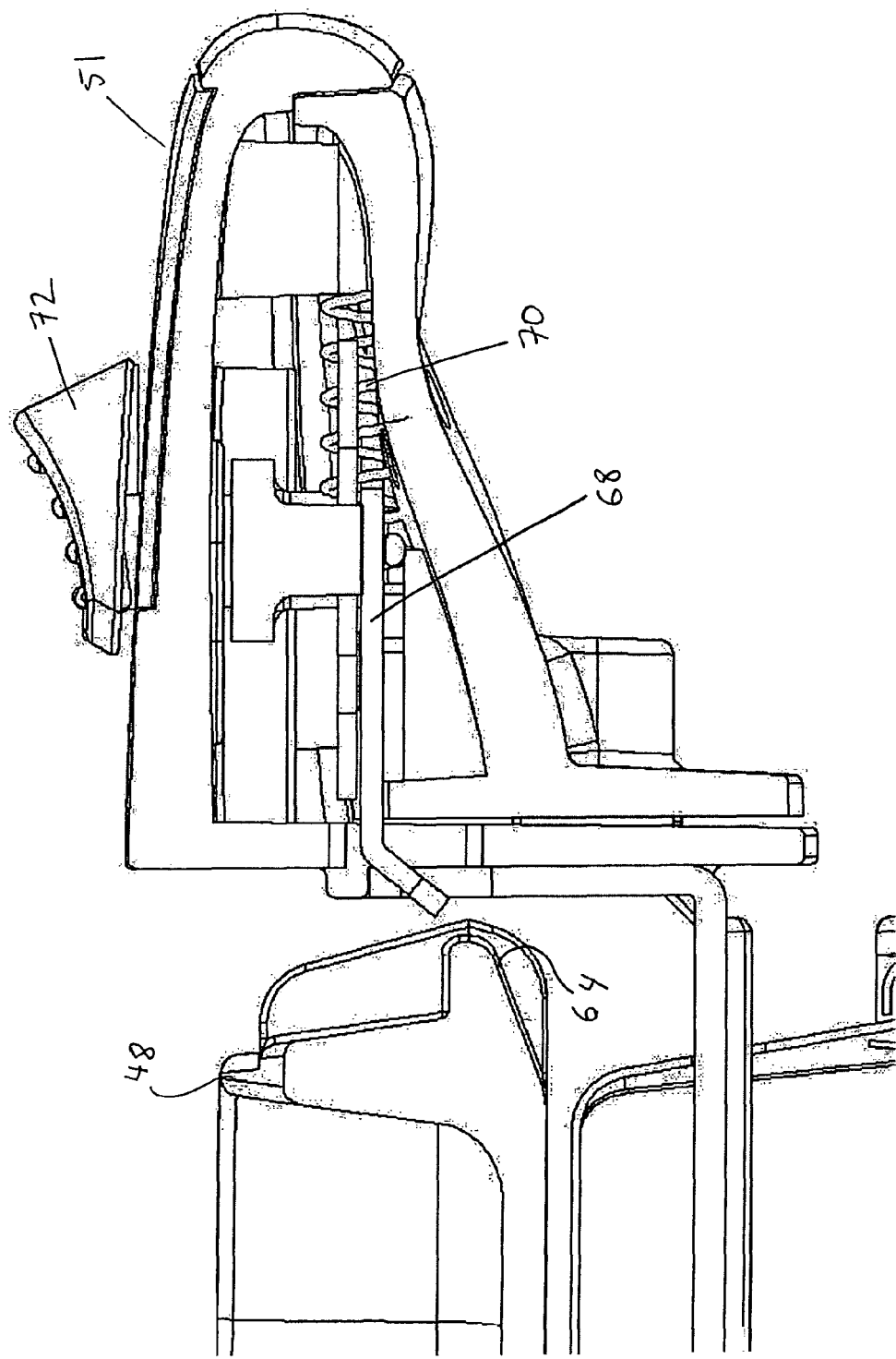
FIG. 9 is a partial side cross section view of a cooking appliance of the present invention showing a removable food support member having a tab and a handle for securing the food member with a retracted catch member.

The handles 50 and 51 are supported by the base 44 and are positioned to extend above the upper surface 52 of the base 44. The first handle 50 includes a resilient clip 66 for engaging a tab 64 to secure the food support member 48 to the upper surface 52 of the base 44. The second handle 51 includes a catch mechanism for selectively engaging a tab 64 of the food support member 48. Referring to FIGS. 7 through 9, details of the catch mechanism are shown. The catch mechanism includes a catch member 68 slidably coupled to the second handle 51. The catch member 68 is biased by a spring 70 that extends the catch member to engage the tab 64 of the food support member 48. The catch member 68 can be retracted by sliding the gripping member 72 which is coupled to the catch member 68. The gripping member 72 allows a user of the appliance to retract the catch member 68 against the force of the spring 70 to release and remove the food support member 48 from the base 44.

The appliance 42 also includes a control panel assembly 74 that includes a temperature control panel 76 and a wire housing 78. The control panel assembly 74 is attached to the lower surface 54 of the base 44. The temperature control panel 76 extends forward beyond the perimeter wall 56 of the base 44, for easy access by a user of the appliance. The wire housing 78 is a narrow channel that houses the wires connecting the temperature control panel 76 to the heating element 44. The wire housing 78 is preferably substantially smaller in width compared to the base 44 of the appliance.

The appliance also includes a removable drip tray 80 that is slidably attached to the lower surface 54 of the base. The drip tray is positioned below a drain hole 82 in the food support member 48 to allow drippings from the cooking surface 58 to be collected in the drip tray 80.

The appliance also includes support members 84 that support the base 44 and provide clearance beneath the lower surface 54 of the base 44 for the control panel assembly 74 and the drip tray 80.

Figure 10:
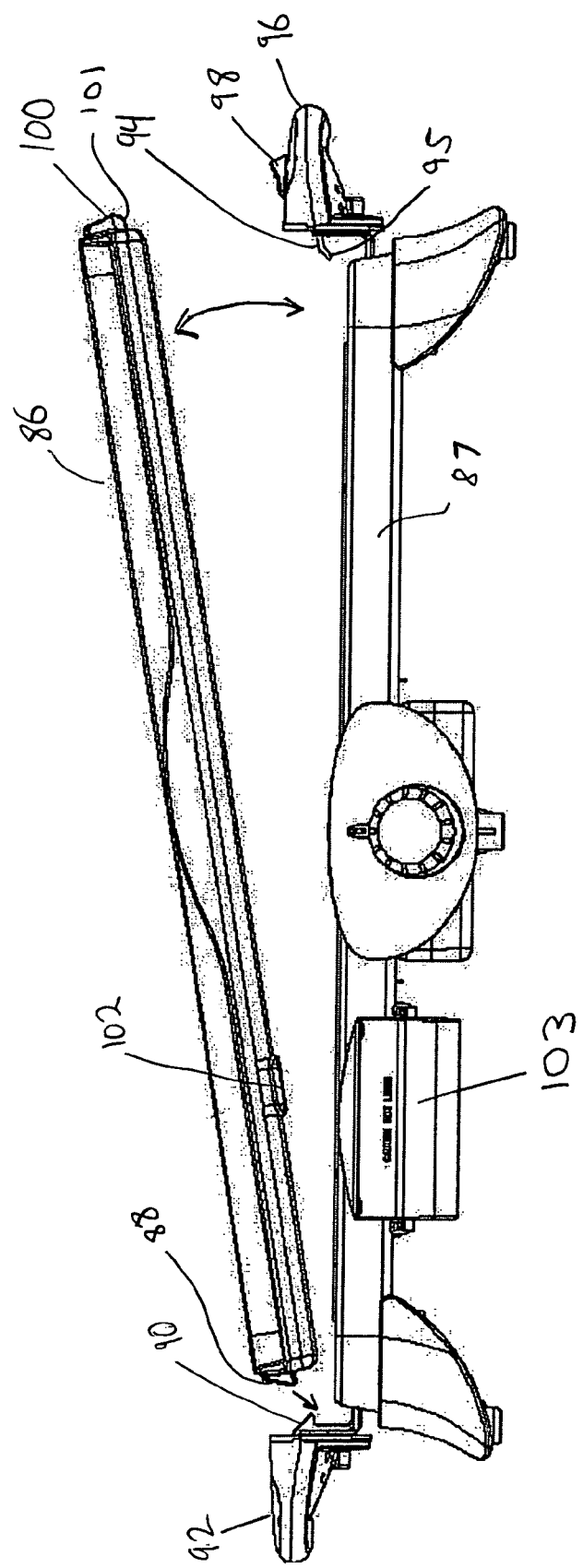
FIG. 10 is a front view of a cooking appliance of the present invention with a removable food support member removed from its base and with handles for securing the food member by engaging tabs.
Figure 11:
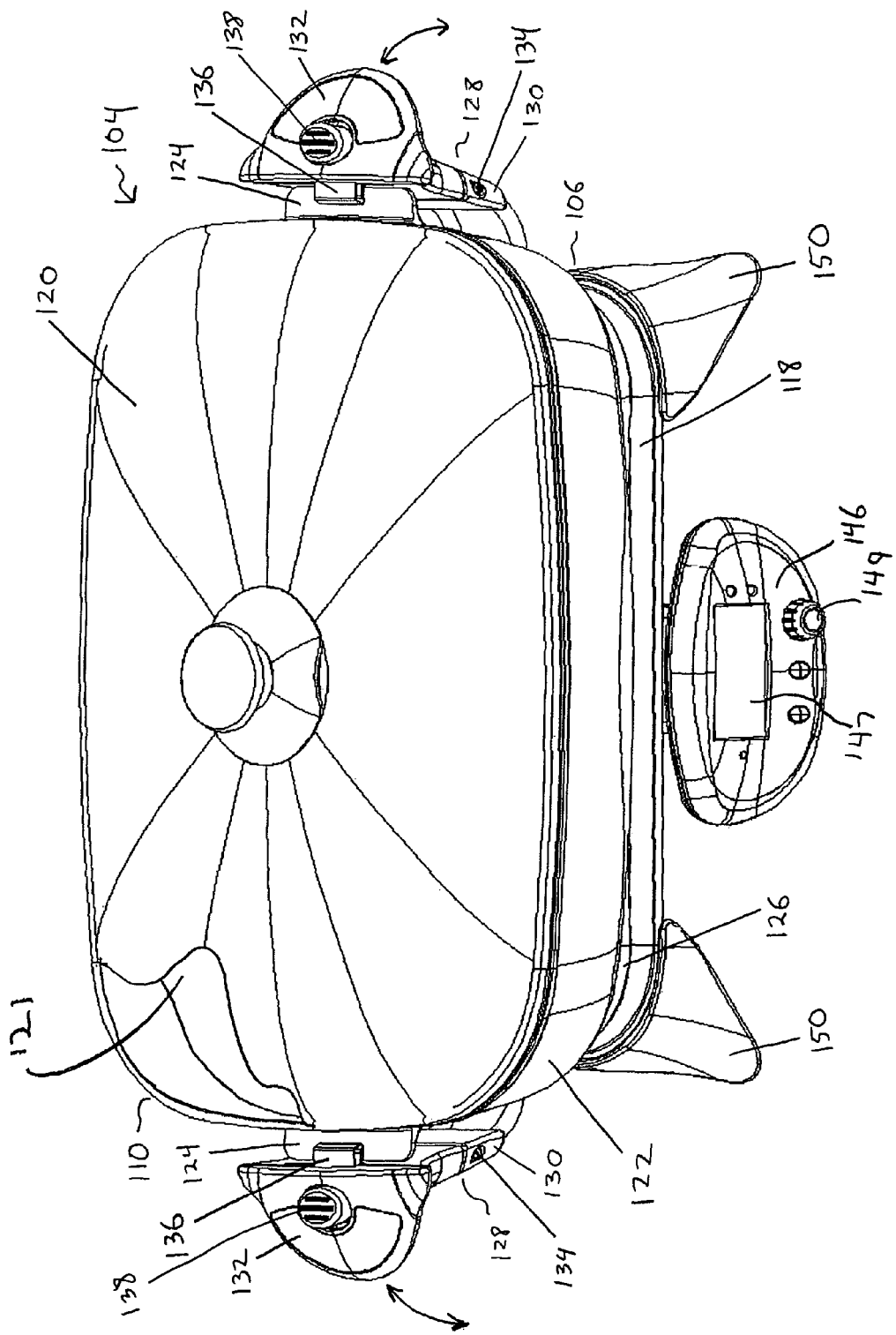
FIG. 11 is a top perspective view of a cooking appliance of the present invention with a removable food support member having tabs and with handles securing the food member by engaging the tabs.

FIG. 10 shows a front view of a cooking appliance of the present invention that includes a food support surface in the form of a removable griddle similar to the appliance described above with respect to FIGS. 4-9. Referring to FIG. 10, it can readily be seen how the griddle is attached to and removed from the base of the appliance. To attach the griddle 86 to the base 87, a user aligns the tab 88 on left side of the griddle 86 with the resilient clip 90 of the left handle 92 and pivots the griddle 86 in place, while retracting the catch member 94 of the right handle 96 using the gripping member 98, to align the tab 100 with the retracted catch member 94. The drain hole 102 is located over the drip tray 103. Once aligned, the user can allow catch-member 94 to extend and engage the tab 100 by releasing the gripping member 98. To remove the griddle, the process is merely reversed.

Alternatively, when attaching the griddle 86 to the base, the angled bottom surface 101 of the tab 100 upon engaging the angled end 95 of catch member 94 may urge the catch member 94 toward the retracted position. When the tab 100 moves below the end of the catch member 94, the catch member will spring back thereby locking the griddle 86 in place. Therefore, a user need not move the gripping member when attaching the food support surface.

Referring to FIGS. 11 through 17, a cooking appliance 104 of the present invention is shown that generally includes a base 106, a heating element 108, a removable food support member 110 and handles 128. The base 106 includes an upper surface 114, a lower surface 116 and a perimeter wall 118. The heating element 108 is supported above the upper surface 114 of the base 106. The removable food support member 110 is shown as a skillet with a cover 120. The food support member 110 includes a cooking surface 121, an opposed bottom surface (not shown) supported by the upper surface 114 of the base 106, a side wall 122 forming a perimeter around the cooking and bottom surfaces and tabs 124 projecting from the side wall 122. The tabs 124 can function as handles for the food support member 110, for removal of the food support member 110 from the base 106 and for transporting the food support member 110. The food support member 110 also includes a bottom wall 126 that forms a skirt around the perimeter of the bottom surface of the food support member 110. This skirt fits relatively closely around the upper edge of the perimeter wall 118 of the base 106 and prevents the food support member 110 from shifting relative to the base 106, when supported by the upper surface 114 of the base 106.

The handles 128 are supported by the base 106 and are positioned to extend above the upper surface 114 of the base 106. The handles 128 include a fixed portion 130 attached to the base 106 and a pivotal portion 132 rotatably coupled to the fixed portion 130, so that the pivotal portion 132 rotates between a first locked position (FIG. 16) and a second open (or disengaged) position (FIG. 17) about a pivotal axis 134. The pivotal portion 132 can be rotated downward to disengage a resilient engagement clip 136 from the tab 124 and to provide clearance from the food support member 110 to allow easy removal from the base 106. Preferably, the pivotal portion 132 can be rotated downward from the first locked position approximately 90°. Accordingly, the handles can be selectively positioned to provide clearance to allow the food support member 110 to be lifted vertically off the base. The pivotal portion 132 is locked in the first locked position by a locking mechanism and released by depressing the actuator 138. The pivoting is preferably unbiased by a positioning force, e.g. by a spring or otherwise, so that it will remain in either the first or second position until a user moves the pivotal portion.

Figure 15:
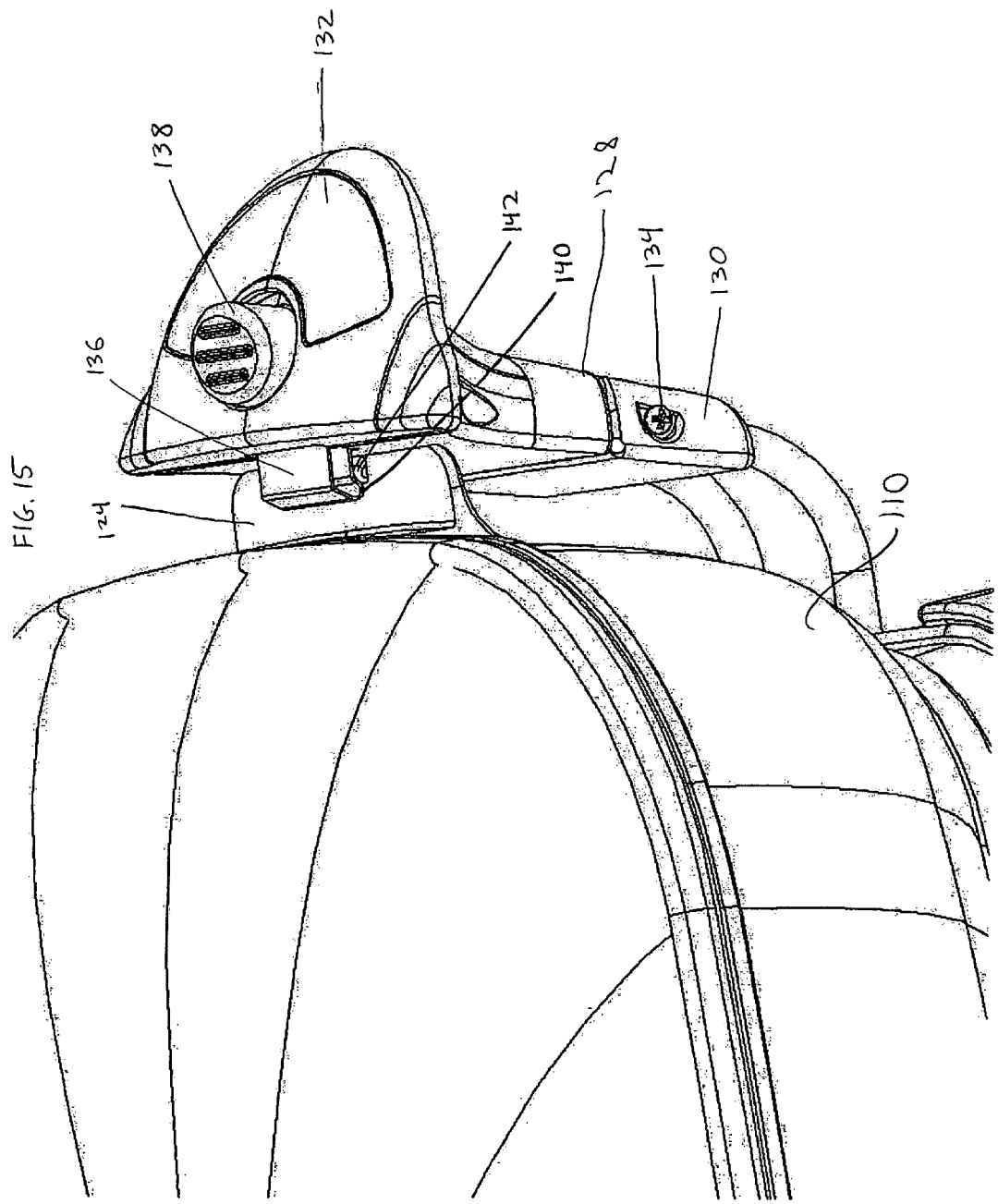
FIG. 15 is a partial top perspective view of the cooking appliance of FIG. 11, showing a removable food support member having a tab and a handle pivotally engaged to the tab with a resilient engagement clip.
Figure 16:
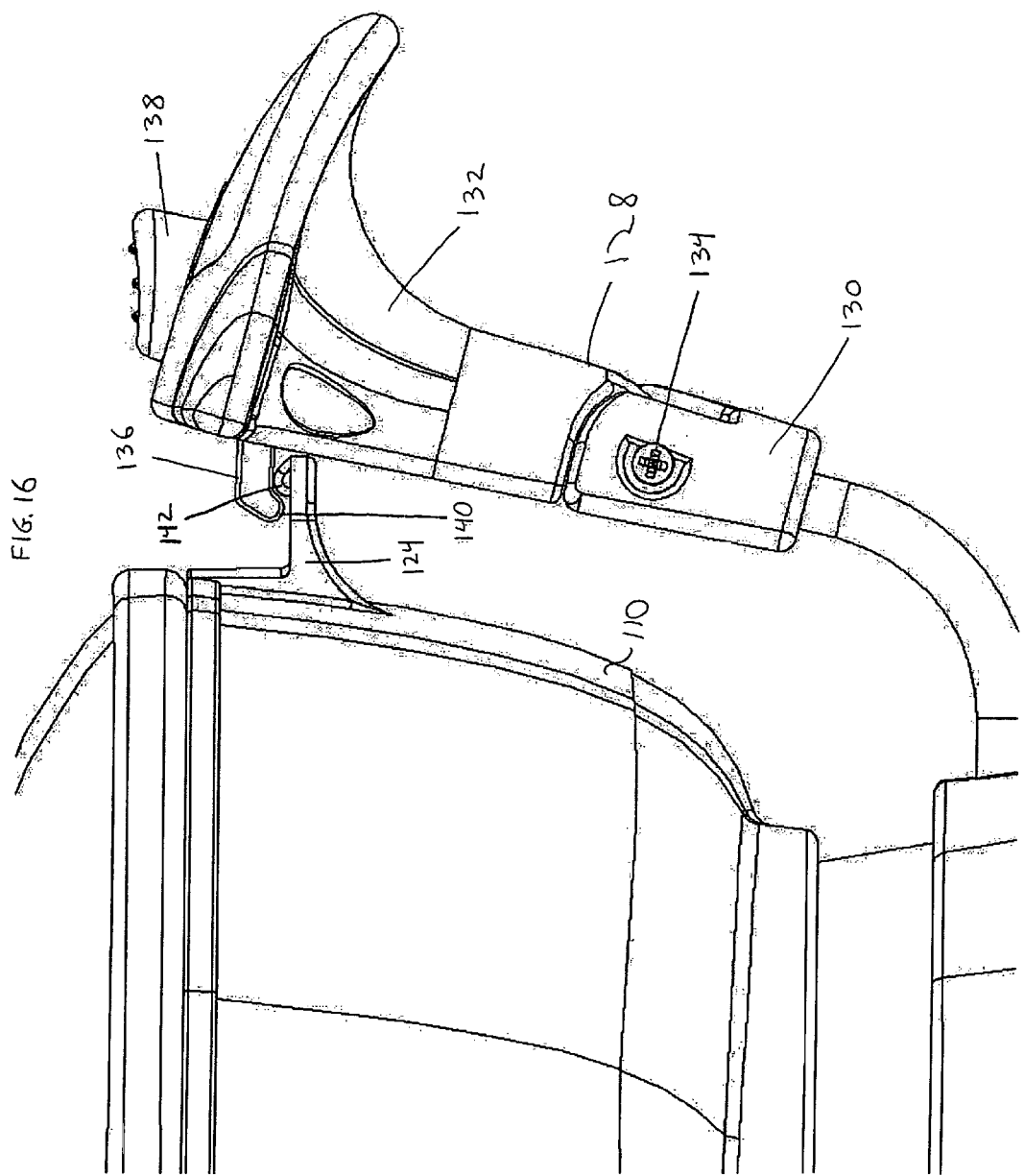
FIG. 16 is a partial side view of the cooking appliance of FIG. 11, showing a removable food support member having a tab and a handle pivotally engaged to the tab with a resilient engagement clip.
Figure 17:
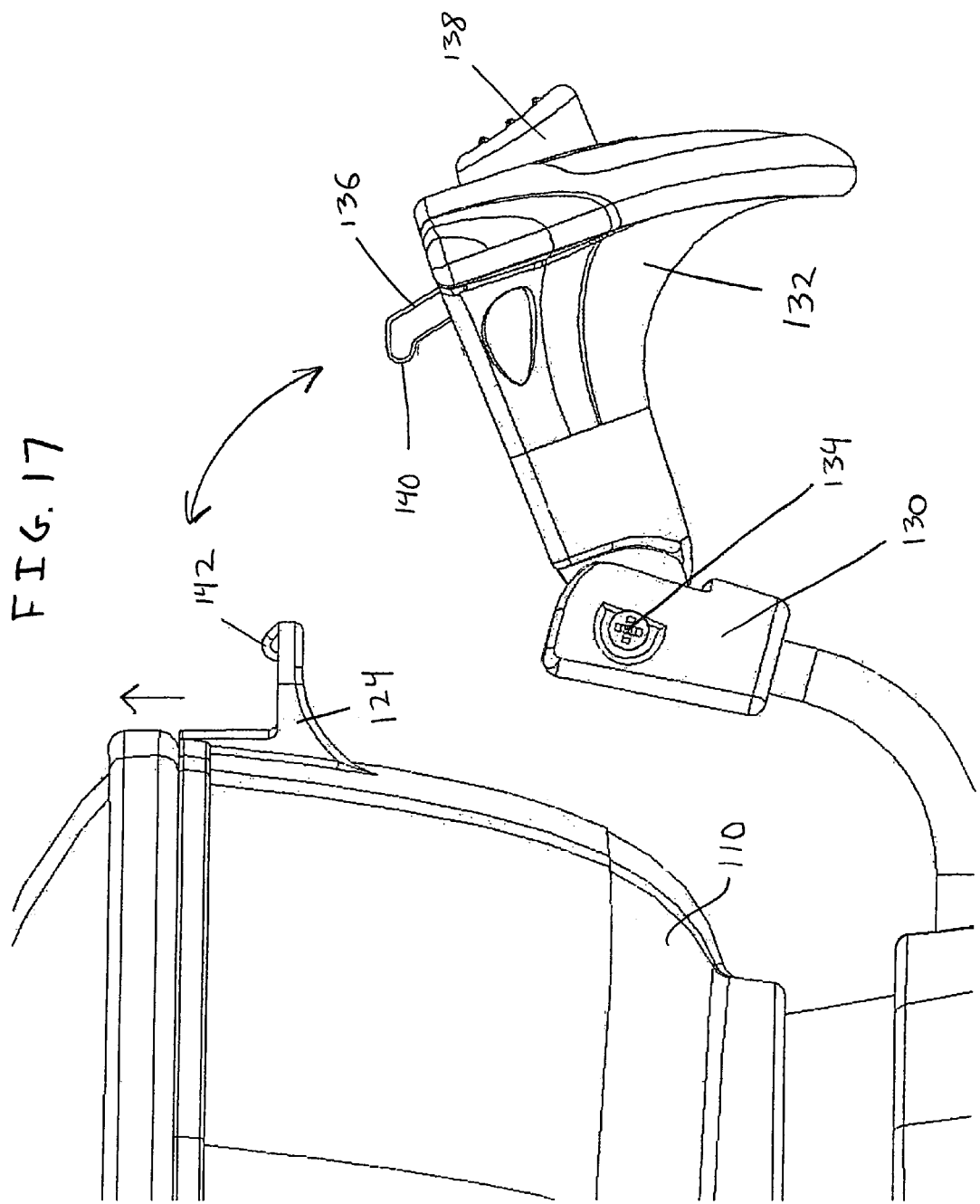
FIG. 17 is a partial side view of the cooking appliance of FIG. 11, showing a removable food support member having a tab and a handle pivotally disengaged from the tab.

In one preferred embodiment, as shown in FIGS. 15 through 17, the resilient engagement clip 136 includes a downward projecting nose portion 140 and the tab 124 includes an upward facing projection 142 at the point of engagement to improve the ability of the clips 136 to secure the food support member 110. The nose portion 140 of the resilient clip 136 deflects as it is pushed past the upward facing projection 142 and is held behind the projection 142 when the pivotal portion 132 is rotated to the first locked position.

Figure 12:
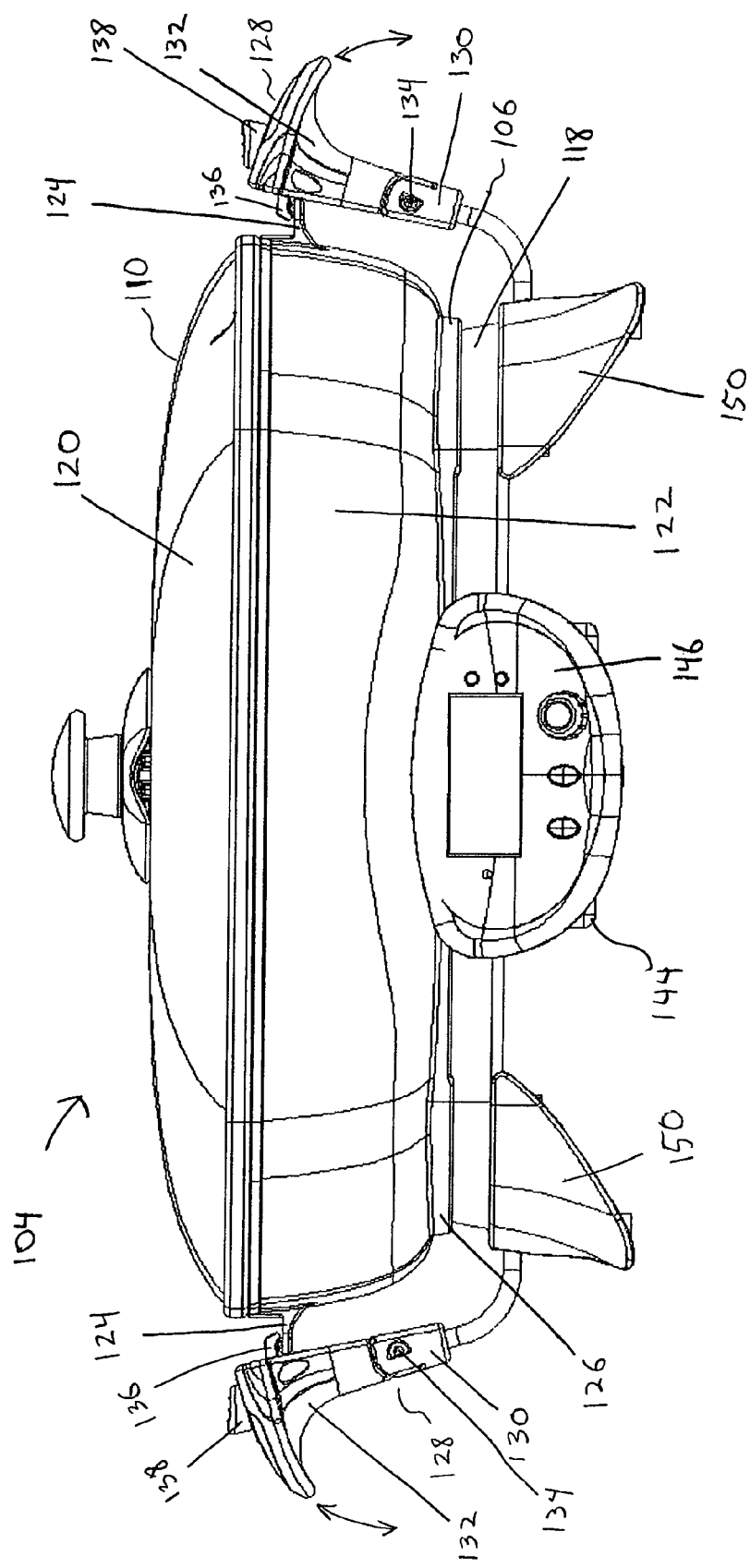
FIG. 12 is a front view of the cooking appliance of FIG. 11.

With further reference to FIGS. 11-14, the appliance 104 also includes a control panel assembly 144 that includes a temperature control panel 146 and a wire housing 148. The control panel assembly 144 is attached to the lower surface 116 of the base 106. The temperature control panel 146 extends forward beyond the perimeter wall 118 of the base 106, for easy access by a user of the appliance. The wire housing 148 can include a narrow channel that houses the wires connecting the temperature control panel 146 to the heating element 108. The wire housing 148 extends along only a portion of the lower surface 116 and extends beyond the perimeter wall 118 to provide clearance for the control panel 146 from the base 106 and the food support member 110. The wire housing (or channel) preferably has a width less than about 4 inches wide over the majority of its length. The control panel may have a digital display 147 and control knob 149 as shown in FIG. 12.

The appliance also includes discrete support members 150, e.g., legs, that support the base 106 and provide clearance beneath the lower surface 116 of the base 106 for the control panel assembly 144.

Figure 13:
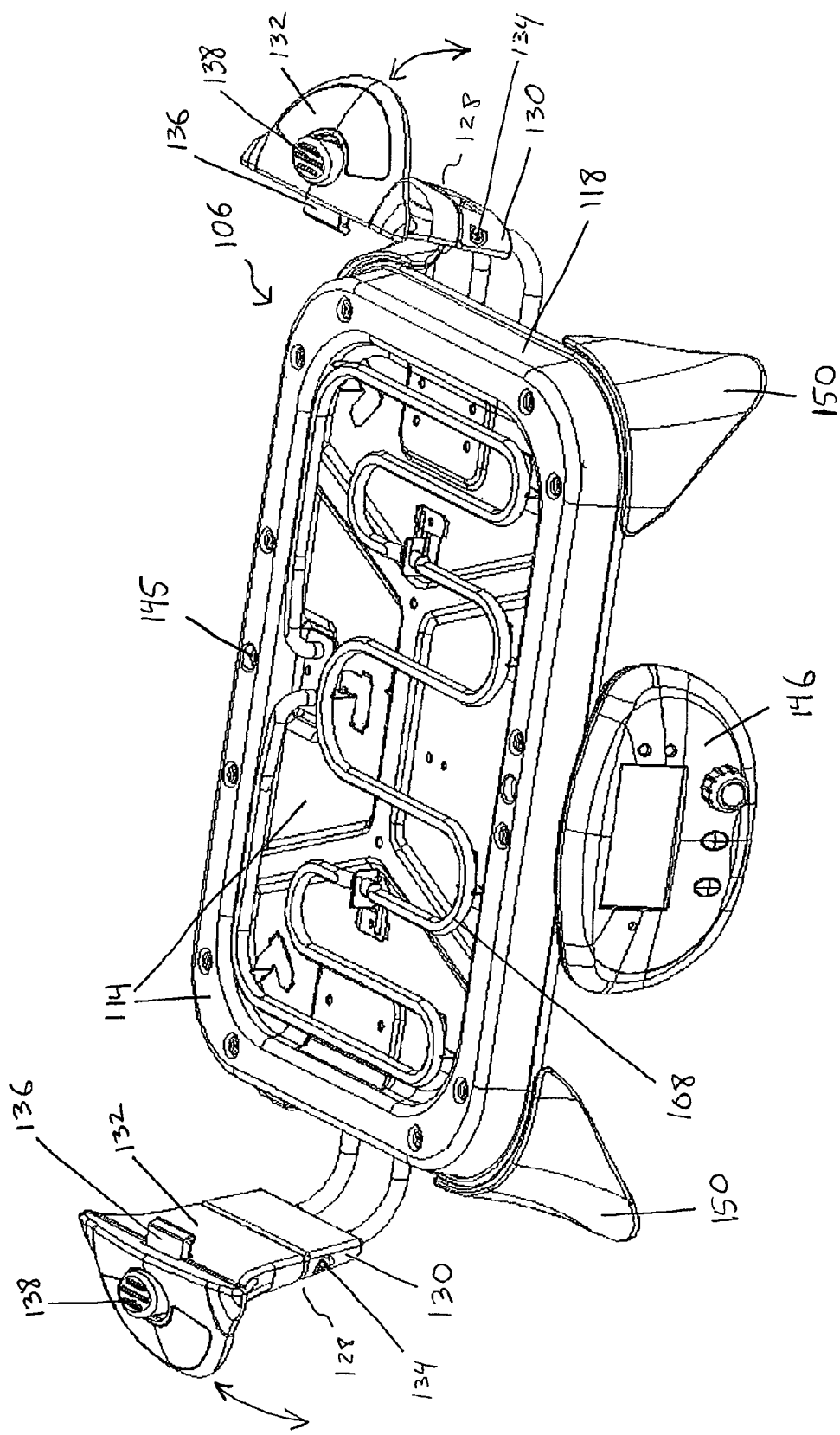
FIG. 13 is a top perspective view of the cooking appliance of FIG. 11, with the food support member removed from its base and with handles for securing the food support member by engaging the tabs.
Figure 14:
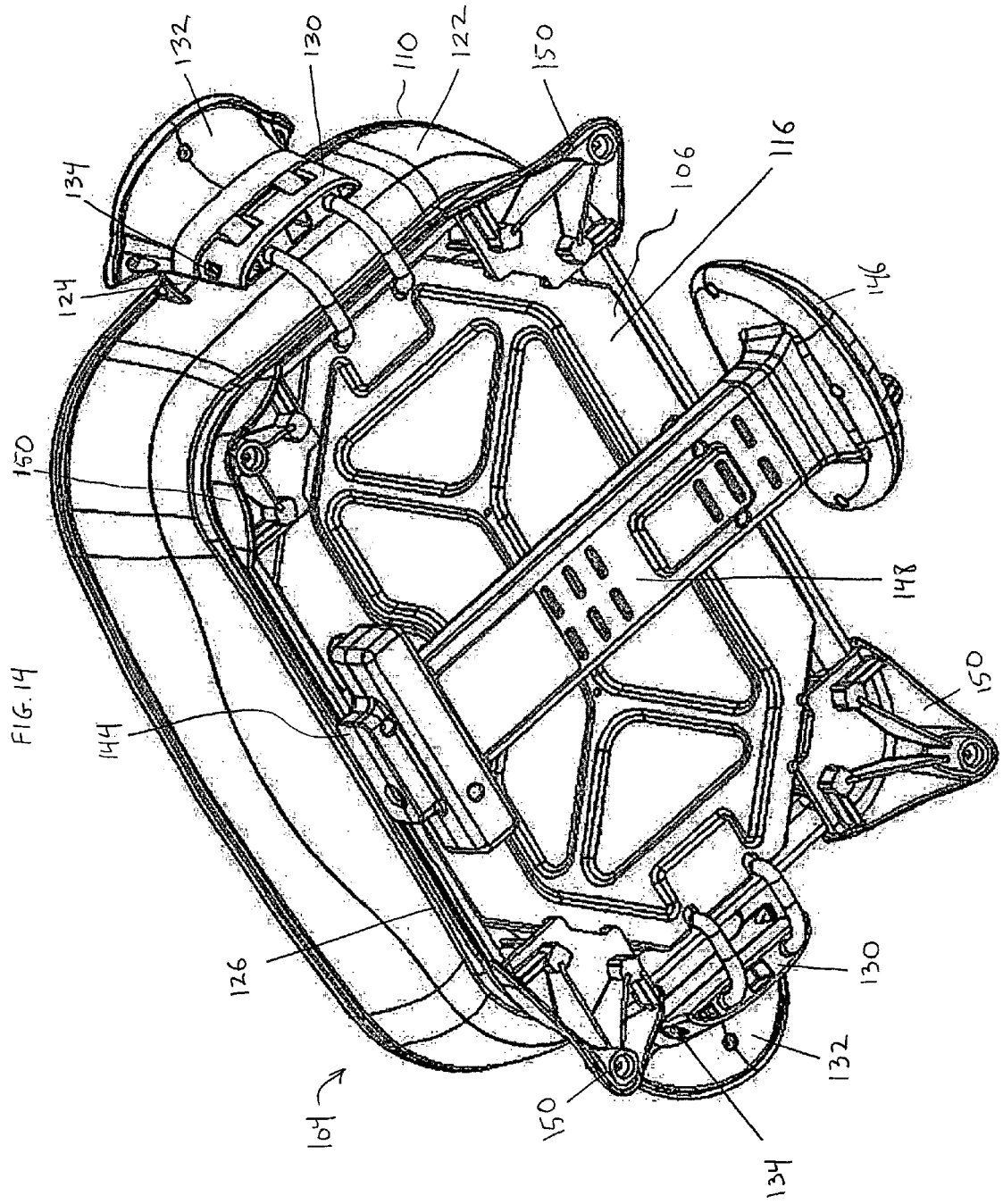
FIG. 14 is a bottom perspective view of the cooking appliance of FIG. 11.

In one embodiment, the appliance of the present invention may also include a switch that is engaged by the removable food support member, wherein the switch electrically disconnects the heating element from a power source and prevents the element from heating up. As shown in FIG. 13, a button 145 is located just below the upper surface 114 of the base 106 and is engaged by a projection (not shown) extending away from the bottom surface of the food support member 110. The heating element 108 will not heat unless the button 145 is engaged by the projection.

Figure 18:
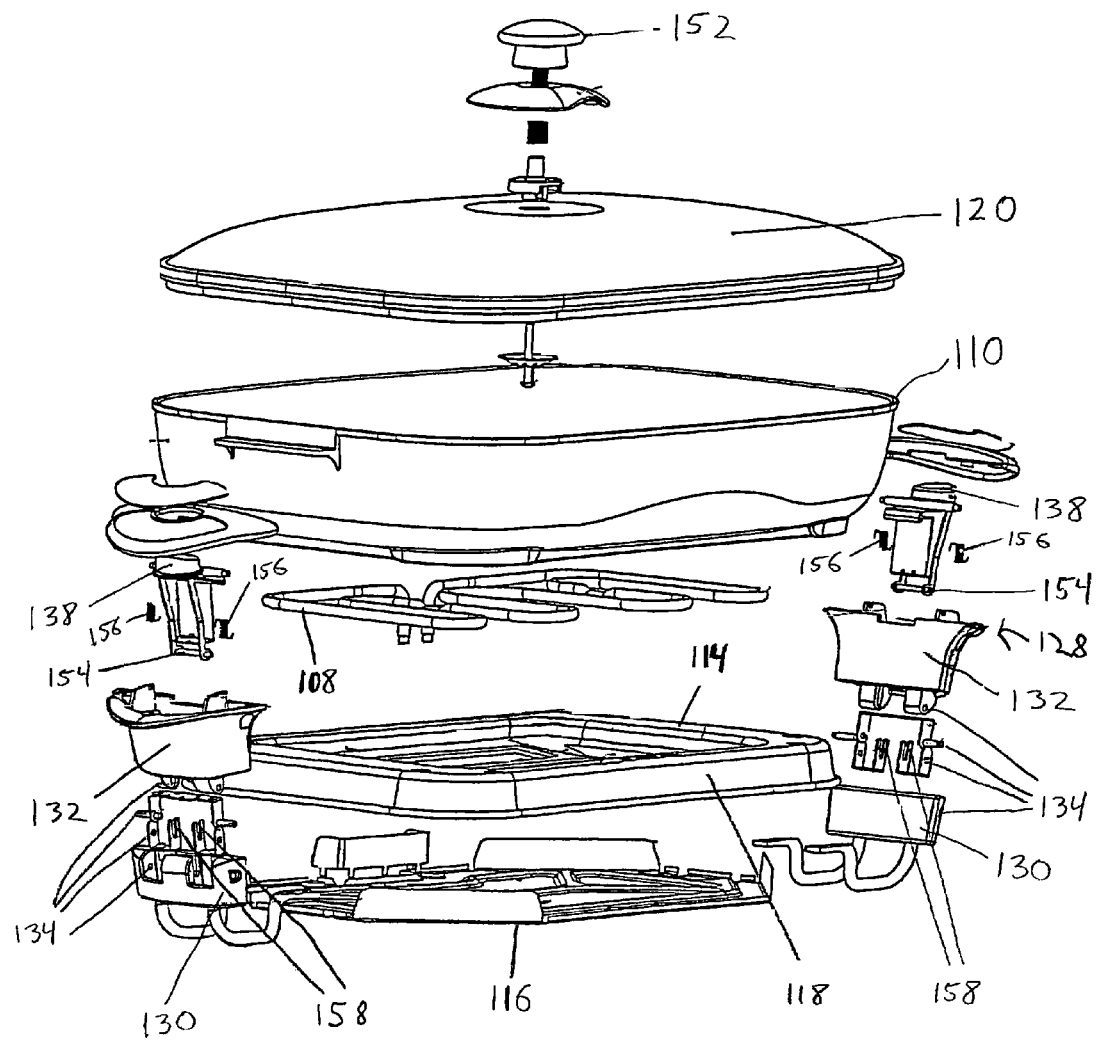
FIG. 18 is a partial top perspective exploded view of the cooking appliance of FIG. 11, showing the removable food support member having tabs, the heating element, the base chassis and the handles for pivotally engaging the tabs of the food support member.

For additional illustration of a preferred embodiment of the present invention, FIG. 18 shows an exploded view of various components for the preferred embodiment shown in FIGS. 11 through 17. Referring to FIG. 18, the components of the electrical cooking appliance include a removable food support member 110 in the form of a skillet; a lid 120 for the skillet having a knob 152; an electric heating element 108; a base assembly having an upper portion that includes an upper surface 114 and a perimeter wall 118, and a lower portion that includes a lower surface 116, which mates with the upper portion to form the base assembly and handle assemblies.

The handle assemblies 128 include a fixed portion 130 and a pivotal portion 132 rotatably coupled to the fixed portion 130, so that the pivotal portion 132 rotates between a first locked position and a second open (or disengaged) position about a pivotal axis 134. The pivotal portion 132 is locked in the first locked position by a locking mechanism and released by depressing the actuator 138. The locking mechanism includes the actuator 138 operatively connected to a locking member 154 that is disposed in the pivotal portion 132. The locking member 154 is movable between a locking position wherein the locking member 154 is offset from the pivotal axis 134 and a pivoting position wherein the locking member 154 is aligned with the pivotal axis. In the locking position, the locking member 154 is normally maintained in the locked position by biasing springs 156, which bias the locking member 154 away from the pivotal axis 134. In the locking position, the locking member 154 is restricted from rotating by restricting members 158.

FIGS. 19A through 19D are schematic representations showing the mechanical action of the preferred locking mechanism for a rotatable handle shown in FIGS. 16-18 and described above. FIG. 19A shows a perspective view of a schematic illustrating the locking mechanism in the locked position. FIG. 19B shows a front view schematic of the locking mechanism in the open (or rotatable) position. FIG. 19C shows a side view of the locking mechanism of FIG. 19A in the locked position. FIG. 19D shows a side view of the locking mechanism of FIG. 19B in the open (or rotatable) position.

Referring to FIGS. 19A-19D, the locking member 154, is slidably movable between a first locking position, as shown in FIGS. 19A and 19C, and a second rotatable position, as shown in FIGS. 19B and 19D. The locking member 154 is movable within a slot formed between a first blocking wall 160 and a second blocking wall 162 which form the restricting members 158. The locking member 154 is coupled to and rotatably fixed to hinge members 164 positioned aligned with the pivotal axis 134. A locking member support 166 may be coupled to the handle pivotal portion 132. The locking member support 166 is coupled to the locking member 154 and is biased by the spring 156 to retain the locking member 154 in the first locking position. As shown in FIGS. 19A and 19C, the locking member 154 is prevented from pivoting about the pivotal axis 134 by the blocking walls 160 and 162. This also prevents the locking member support 166 from pivoting about the pivotal axis 134. Therefore, the handle pivotal portion 132 remains in the first locked position.

As shown in FIGS. 19B and 19D, the locking member 154 is moved downwardly, such as upon depression of the actuator 138, and aligned with the pivotal axis 134 in the second rotatable position. The locking member 154 is therefore no longer blocked from pivoting about the pivotal axis 134 by the blocking walls 160 and 162. This allows the locking member 134 to rotate along with the hinge members 164 and allows the locking member support 166 to rotate past blocking wall 160, as shown. Therefore, the handle pivotal portion 132 may then be rotated to the open position.

It may be seen from FIGS. 19A-19D how the locking mechanism according to the preferred embodiment works in connection with the pivotal portion 132 of the handle 128, when the locking member support 166 is coupled to the pivotal portion 132 of the handle 128.

Thus while there has been described what are presently believed to be preferred embodiments of the present invention, other and further modifications and changes can be made thereto without departing from the true spirit of the invention. It is intended to include all further and other modifications and changes that would come within the true scope of the invention as set forth above and in the drawings.

What is claimed is:

1. An electric cooking appliance comprising:
    a base having an upper surface, a lower surface and a perimeter wall;
    an electrical heating element supported on said base;
    a removable food support member having a cooking surface and an opposed bottom surface supported by said upper surface of said base; and
    a plurality of handles extending from said base said plurality of handles each including a member providing a structure for a user to grab and thereby hold said base, said handle members being fixedly secured to said base in a non-pivotal manner, the plurality of handles being positioned to extend above said upper surface, and one of said plurality of non-pivoting handle members including a catch member movable relative to said handle for selectively engaging and disengaging said removable food support member, said catch member being operatively connected to an actuator disposed on the handle and engagable by a user, said actuator being linearly translatable relative to the handle to move the catch to the retracted position, wherein the engagement of said catch member with said removable food support member secures said food support member to said base to prevent removal of said food support member from said base and a released position wherein said food support member is removable from said base.

2. An appliance according to claim 1, wherein said base further comprises a switch that is engaged by said removable food support member, wherein said switch electrically disconnects said heating element from a power source if said food support member is removed from said base.

3. An appliance according to claim 1, wherein said food support member further comprises a drain to allow liquid to drain from the cooking surface of said food support member.

4. An appliance according to claim 3, further comprising a drip tray slidably attached to said lower surface of said base and positioned to catch liquid flowing through said drain.

5. An appliance according to claim 1, further comprising a control panel assembly attached to said lower surface of said base, said assembly comprising a temperature control panel and a wire housing, wherein said temperature control panel is positioned to extend outside of said perimeter wall of said base and said wire housing encloses wires electrically connecting said control panel to said heating element.

6. An appliance according to claim 5, wherein said wire housing includes a channel extending along said lower surface and beyond said perimeter wall.

7. An appliance according to claim 6, wherein said channel extends over only a portion of said lower surface.

8. An electric cooking appliance comprising:
a base having an upper surface, a lower surface and a perimeter wall;
an electrical heating element supported on said base;
a removable food support member having a cooking surface and an opposed bottom surface supported by said upper surface of said base; and
a first and second handle extending from and secured to opposing sides of said base and positioned to extend above said upper surface of said base, said first handle including a clip extending therefrom, said clip being fixedly retained on said first handle and actuation of the clip is not required to remove said food support member from said base; and
said second handle having disposed thereon an actuator linearly translatable relative thereto, the actuator being operably connected to a catch, and wherein upon translation of the actuator, the catch moves relative to said second handle between a retracted position wherein the food support surface is removable from said base and an extended position wherein said catch engages said removable food support member wherein removal of said food support member from said base is prevented.

9. An appliance according to claim 8, wherein said cooking surface including an opening there through to permit the flow of cooking fluid away from said cooking surface.

10. An appliance according to claim 8, wherein said food support member includes a side wall bounding said cooking surface, said side wall including at least one tab projecting outwardly therefrom, said tab being engagable with said catch.

11. An appliance according to claim 8, wherein said base includes a controller projecting from said base, and an elongate channel disposed on a bottom surface of said base, said channel housing an electrical connection between said controller and said heating element.

12. An appliance according to claim 8, wherein said first and second handles are non-pivotally fixed to said base.

13. An appliance according to claim 8, wherein said food support member includes first and second tabs extending outwardly therefrom, said first tab engages said clip and said second tab engages said catch when said food support member is secured to said base, and wherein translation of said catch releases said second tab and movement of said food support member from said base releases said first tab from said clip.

14. An appliance according to claim 8, wherein said food support member includes first and second tabs extending outwardly therefrom, said second tab includes a sloping bottom surface and said catch has a complementary shape wherein engagement of the bottom surface of the second tab with the catch causes the catch to move to the retracted position.

15. An appliance according to claim 8, wherein said clip has a projection portion and said first tab is disposed beneath said projection portion when said food support member is secured to said base.

16. An appliance according to claim 1, wherein said catch member is biased into the engagement with said food support member.

17. An appliance according to claim 1, wherein said heating element is secured to said base when said food support member is separated from said base.

18. An appliance according to claim 8, wherein said catch mechanism is biased in said extended position.

19. An appliance according to claim 13, wherein said catch in said extended position extends over said second tab to prevent said food support member from being removed from said base.

20. An appliance according to claim 8, wherein said food support member is secured to said base such that removal of said food support member from said base displaces said food support member from said heating element.

21. An electric cooking appliance comprising:
a base having an upper surface, a lower surface and a perimeter wall;
an electrical heating element supported on said base;
a removable food support member having a cooking surface and an opposed bottom surface supported by said upper surface of said base; and
a first and second handle extending from and secured to opposing sides of said base and positioned to extend above said upper surface of said base, said first handle including a clip extending therefrom and said second handle having disposed thereon an actuator operably connected to a catch, and upon linear translation of the actuator, the catch being moveable relative to said second handle between a retracted position wherein the food support surface is removable from said base and an extended position wherein said catch engages said removable food support member such that removal of said food support member from said base is prevented, and wherein said food support member includes first and second tabs extending outwardly therefrom, said first tab engages said clip and said second tab engages said catch when said food support member is secured to said base, and wherein translation of said catch releases said second tab and movement of said food support member from said base releases said first tab from said clip.

22. An appliance according to claim 21, wherein said catch in said extended position extends over said second tab to prevent said food support member from being removed from said base.

23. An electric cooking appliance comprising:
a base having an upper surface, a lower surface and a perimeter wall;
an electrical heating element supported on said base;
a removable food support member having a cooking surface and an opposed bottom surface supported by said upper surface of said base, said food support member including first and second tabs extending outwardly therefrom;

a first and second handle extending from and secured to opposing sides of said base and positioned to extend above said upper surface of said base, said first handle including a clip extending therefrom, said clip having a projection portion and said first tab is disposed beneath said projection portion when said food support member is secured to said base; and said second handle having disposed thereon an actuator linearly translatable relative thereto, the actuator being operably connected to a catch, and wherein upon translation of the actuator, the catch moves relative to said second handle between a retracted position wherein the food support surface is removable from said base and an extended position wherein said catch engages said removable food support member wherein removal of said food support member from said base is prevented.

24. An electric cooking appliance comprising:

a base having an upper surface, a lower surface and a perimeter wall;

an electrical heating element supported on said base;

a removable food support member having a cooking surface and an opposed bottom surface supported by said upper surface of said base; and a first and second handle extending from and fixedly secured to opposing sides of said base and positioned to extend above said upper surface of said base;

said first handle including a clip extending therefrom and engagable with said food support member; and said second handle having extending therefrom an actuator operably connected to a catch mechanism including a catch, said catch having an engaged position wherein said catch engages said removable food support member to prevent removal of said food support member from said base, the actuator being linearly translatable relative to the handle to move the catch from the engaged position to a retracted position wherein the food support surface is removable from said base.

* * * * *